（12）United States Patent
Choi et al.

(10) Patent No.: US 12,538,242 B2
(45) Date of Patent: Jan. 27, 2026

(54) DEVICE AND METHOD FOR CONTROLLING TRANSMISSION POWER ACCORDING TO WHETHER DISPLAY IS EXTENDED IN ELECTRONIC DEVICE COMPRISING GRIP SENSOR

(71) Applicant: SAMSUNG ELECTRONICS CO., LTD., Suwon-si (KR)

(72) Inventors: Gwangho Choi, Suwon-si (KR); Jongah Kim, Suwon-si (KR); Heewoong Yoon, Suwon-si (KR); Kihyuk Lee, Suwon-si (KR); Donghan Lee, Suwon-si (KR); Jeongho Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 422 days.

(21) Appl. No.: 18/096,181

(22) Filed: Jan. 12, 2023

(65) Prior Publication Data

US 2023/0171708 A1 Jun. 1, 2023

Related U.S. Application Data

(63) Continuation of application No. PCT/KR2021/009729, filed on Jul. 27, 2021.

(30) Foreign Application Priority Data

Jul. 27, 2020 (KR) ........................ 10-2020-0093180

(51) Int. Cl.
*H04W 52/28* (2009.01)
(52) U.S. Cl.
CPC ................................ *H04W 52/288* (2013.01)

(58) Field of Classification Search
CPC .. H04W 52/288; H04W 52/283; G06F 1/1677
See application file for complete search history.

(56) References Cited

U.S. PATENT DOCUMENTS 8,502,788 B2 8/2013 Cho
9,298,296 B2 3/2016 Park
(Continued)

FOREIGN PATENT DOCUMENTS

JP 2004-179995 6/2004
JP 2017-33116 2/2017
(Continued)

OTHER PUBLICATIONS

International Search Report for PCT/KR2021/009729, mailed Nov. 23, 2021, 5 pages.
(Continued)

*Primary Examiner* — Ayodeji O Ayotunde
(74) *Attorney, Agent, or Firm* — NIXON & VANDERHYE P.C.

(57) ABSTRACT

An electronic device according to various embodiments comprises: a slidable housing including a first housing and a second housing; a flexible display visible to the outside of the electronic device via at least a part of the slidable housing; a wireless communication circuit; a grip sensor; and at least one processor electrically connected to the flexible display, the wireless communication circuit, and the grip sensor, wherein the at least one processor is configured to: recognize that the slidable housing is in a first state and sets, to a first parameter corresponding to the first state, a parameter related to the proximity of a human body if a capacitance measurement value associated with the slidable housing satisfies a first range, and recognizes that the slidable housing is in a second state different from the first state and sets the parameter to a second parameter corresponding to the second state if the capacitance measurement (Continued)

value associated with the slidable housing satisfies a second range different from the first range, and the wireless communication circuit can control transmission power based on the result of comparison between a value measured by the grip sensor and the first parameter or the second parameter.

15 Claims, 14 Drawing Sheets

(56) References Cited

U.S. PATENT DOCUMENTS

| | | | |
|---|---|---|---|
| 10,110,267 | B2 | 10/2018 | Kim et al. |
| 10,136,399 | B1 | 11/2018 | Rouaissia |
| 10,148,304 | B2 | 12/2018 | Chang et al. |
| 11,082,550 | B2 | 8/2021 | Rouaissia et al. |
| 11,194,363 | B2 | 12/2021 | Kim et al. |
| 11,201,635 | B2 | 12/2021 | Chu et al. |
| 2014/0043259 | A1 | 2/2014 | Park |
| 2014/0211399 | A1 | 7/2014 | O'Brien |
| 2016/0173185 | A1 | 6/2016 | Kang et al. |
| 2016/0202781 | A1 | 7/2016 | Kim et al. |
| 2018/0176352 | A1* | 6/2018 | Shin ............... H04M 1/0266 |
| 2019/0067801 | A1 | 2/2019 | Kang et al. |
| 2019/0103659 | A1 | 4/2019 | Heo |
| 2020/0136668 | A1* | 4/2020 | Chu ............... G06F 1/1616 |

FOREIGN PATENT DOCUMENTS

| | | |
|---|---|---|
| KR | 10-2016-0087460 | 7/2016 |
| KR | 10-2016-0139470 | 12/2016 |
| KR | 10-2018-0125869 | 11/2018 |
| KR | 10-2019-0023995 | 3/2019 |
| KR | 10-2019-0038023 | 4/2019 |
| KR | 10-2019-0062855 | 6/2019 |
| KR | 10-2009926 | 10/2019 |
| KR | 10-2020-0006007 | 1/2020 |
| KR | 10-2020-0049391 | 5/2020 |
| KR | 10-2126995 | 6/2020 |

OTHER PUBLICATIONS

Written Opinion of the ISA for PCT/KR2021/009729, mailed Nov. 23, 2021, 4 pages.
Korean Office Action issued Nov. 8, 2024 in corresponding Korean Patent Application No. 10-2020-0093180.
Korean Notice of Final Rejection dated Jul. 7, 2025 for KR Application No. 10-2020-0093180.

* cited by examiner

DEVICE AND METHOD FOR CONTROLLING TRANSMISSION POWER ACCORDING TO WHETHER DISPLAY IS EXTENDED IN ELECTRONIC DEVICE COMPRISING GRIP SENSOR

CROSS-REFERENCE TO RELATED APPLICATIONS

This application is a continuation of International Application No. PCT/KR2021/009729 designating the United States, filed on Jul. 27, 2021, in the Korean Intellectual Property Receiving Office and claiming priority to Korean Patent Application No. 10-2020-0093180, filed on Jul. 27, 2020, in the Korean Intellectual Property Office, the disclosures of which are incorporated by reference herein in their entireties.

BACKGROUND

Field

The disclosure relates to a device and a method for controlling transmission power based on whether a display is extended in an electronic device including a grip sensor.

Description of Related Art

Portable electronic devices were decreased in size with emphasis on portability thereof but in recent years, portable electronic devices that have been enlarged to the extent that the word portable device is overshadowed have appeared. Furthermore, recently released portable electronic devices have a transformable feature and thus the boundaries between categories indicated by the names classified according to the size of electronic devices are blurring.

A portable electronic device contains various sensors including a grip sensor. The grip sensor is a component for converting touch stimulation applied to the portable electronic device into an electrical signal and may function as the tactile nerve among the sensory nerves of the human body.

Furthermore, portable electronic devices emit electromagnetic waves when used and electronic devices released to the market are required to be designed to have a reduced electromagnetic wave absorption rate (specific absorption rate (SAR)) lower than a predetermined level, which defines the rate at which the electromagnetic waves are absorbed by the human body.

Previously released portable electronic devices have been designed to be capable of controlling the transmission power, which determines the electromagnetic wave absorption rate, on the premise that the electronic devices have fixed shapes. However, in the case of transformable portable electronic devices which may have different shapes according to their deformation, it may be impossible to determine a standard for controlling the transmission power.

Furthermore, in case that the transmission power is controlled according to a measurement value by the grip sensor without considering deformation of deformable portable electronic devices, there may be a problem in that the electromagnetic wave absorption rate is determined without reflecting the usage situation of a user who uses the portable electronic device.

SUMMARY

Embodiments of the disclosure may provide an electronic device and a method for controlling transmission power by reflecting a measurement value of a grip sensor corresponding to a transformed state of a deformable portable electronic device.

An electronic device according to various example embodiments includes: a slidable housing including a first housing and a second housing coupled to the first housing and configured to be movable within a designated range with respect to the first housing; a flexible display visible outside of the electronic device through at least a portion of the slidable housing; a wireless communication circuit; a grip sensor; and at least one processor electrically connected to the flexible display, the wireless communication circuit, and the grip sensor, wherein the at least one processor is configured to: recognize, based on a capacitance measurement value associated with the slidable housing satisfying a first range, that the slidable housing is in a first state and configures a parameter related to a proximity of a human body as a first parameter corresponding to the first state; and recognize, based on the capacitance measurement value associated with the slidable housing satisfying a second range different from the first range, that the slidable housing is in a second state different from the first state and configures the parameter related to the proximity of a human body as a second parameter corresponding to the second state, and control the wireless communication circuit control transmission power based on a result of comparison between a value measured by the grip sensor and the first parameter or the second parameter.

A method of operating an electronic device according to various example embodiments may include: based on a capacitance measurement value associated with a slidable housing included in the electronic device satisfying a first range, recognizing that the slidable housing is in a first state, and configuring a parameter related to a proximity of a human body as a first parameter corresponding to the first state; and based on the capacitance measurement value associated with the slidable housing satisfying a second range different from the first range, recognizing that the slidable housing is in a second state different from the first state, configuring the parameter related to the proximity of a human body as a second parameter corresponding to the second state, and controlling transmission power based on a result of comparison between a value measured by a grip sensor included in the electronic device and the first parameter or the second parameter.

An electronic device according to various example embodiments includes: a slidable housing including a first housing and a second housing coupled to the first housing and configured to be movable within a designated range with respect to the first housing; a flexible display visible outside of the electronic device through at least a portion of the slidable housing; a wireless communication circuit; a grip sensor; and at least one processor electrically connected to the flexible display, the wireless communication circuit, and the grip sensor, wherein the at least one processor is configured to: recognize, based on a first capacitance measurement value associated with the slidable housing satisfying a first range and a second capacitance measurement value associated with the slidable housing satisfying a second range, that the slidable housing is in a first state and configures a parameter related to a proximity of a human body as a first parameter corresponding to the first state; and recognize, based on the capacitance measurement value associated with the slidable housing satisfying a second range different from the first range, the slidable housing being in a second state different from the first state and configures the parameter related to the proximity of a human body as a second parameter corresponding to the second state, and control the wireless communication circuit to control transmission power based on a result of comparison between a value measured by the grip sensor and the first parameter or the second parameter.

Degradation of antenna performance may be prevented and/or reduced by determining an extension state of a display to identify a usage state of an electronic device and controlling transmission power based on the identified usage state of the electronic device to prevent and/or reduce unnecessary antenna radiation.

By controlling transmission power based on the usage state of the electronic device, electromagnetic wave absorption rate may be reduced to be suitable for the usage state and negative effects on the human body may be reduced.

By determining the extension state of the display through a capacitance variation, the disclosure may be applied to new types of deformable electronic devices that will appear in the future.

In addition, various effects directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with a description of the drawings, like or similar reference numerals may be used for like or similar elements.

DETAILED DESCRIPTION

Hereinafter, various example embodiments of the disclosure will be described with reference to the accompanying drawings. However, this is not intended to limit the disclosure to specific embodiments, and it should be understood that various modifications, equivalents, or alternatives of the embodiments of the disclosure are included.

Figure 1A:
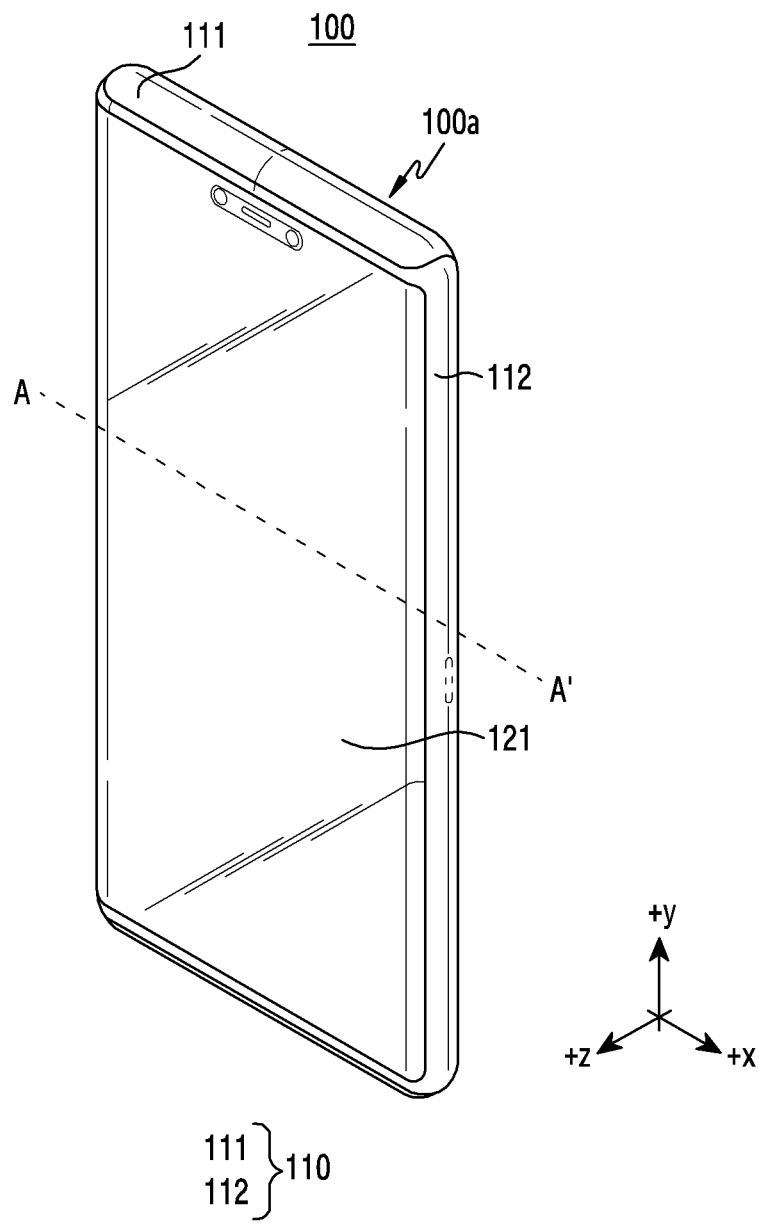
FIG. 1A is a front perspective view illustrating an electronic device in a first state according to various embodiments.
Figure 1B:
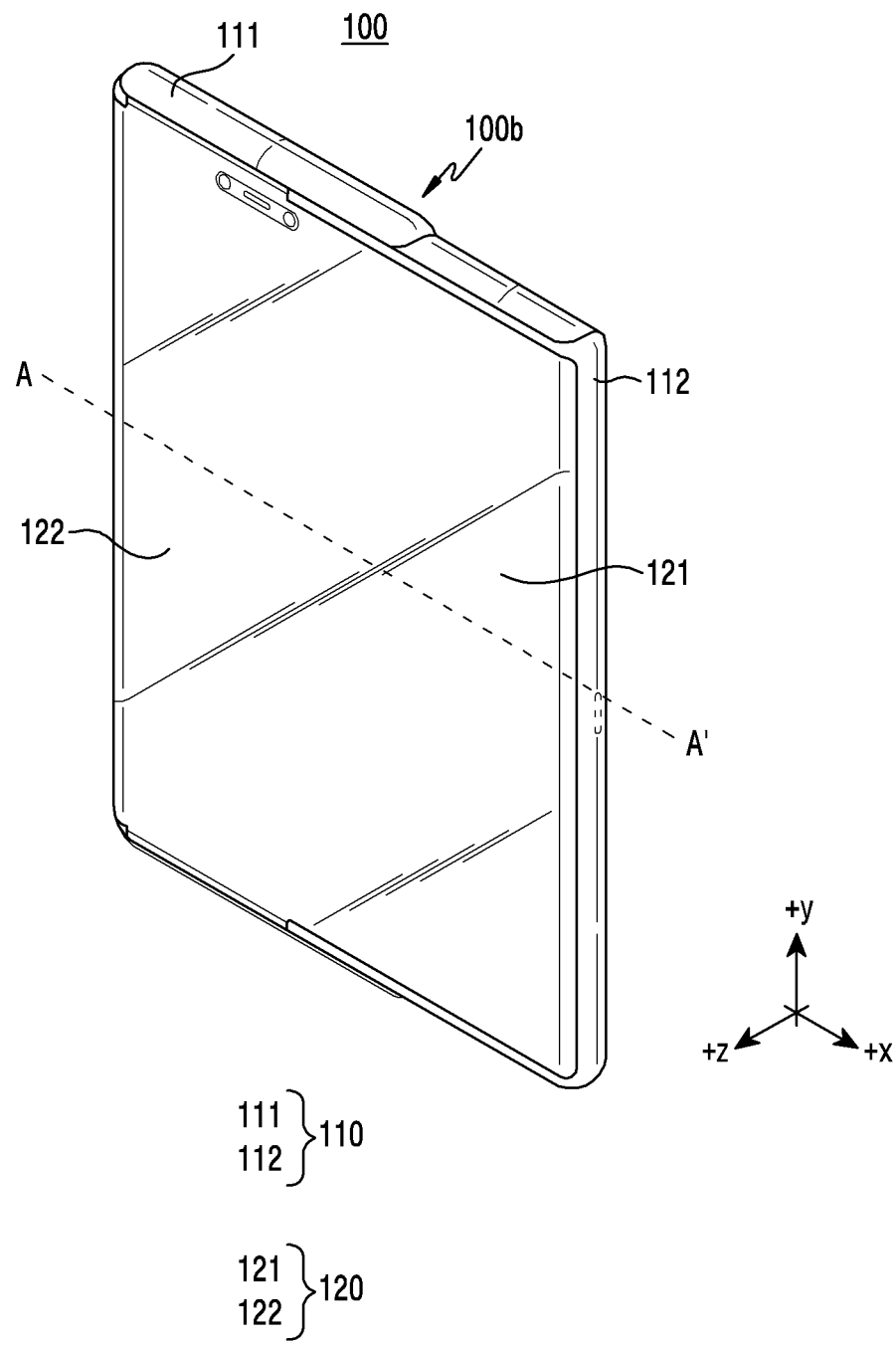
FIG. 1B is a front perspective view illustrating an electronic device in a second state according to various embodiments.

FIG. 1A is a front perspective view illustrating an electronic device 100 in a first state according to various embodiments. FIG. 1B is a front perspective view illustrating an electronic device 100 in a second state according to various embodiments.

In various embodiments disclosed herein, a surface facing a direction substantially the same as a direction in which at least a portion (e.g., a first part 121) of a flexible display 120 located outside the electronic device 100 may be referred to as a front surface of the electronic device 100 and a surface facing the front surface may be referred to as a rear surface of the electronic device 100. A surface surrounding a space between the front surface and the rear surface may be referred to as a lateral surface of the electronic device 100.

Referring to FIG. 1A and FIG. 1B, a flexible display 120 may be disposed on at least a portion of the electronic device 100 according to an embodiment.

In an embodiment, the flexible device 120 may include at least a portion of a planar shape and at least a portion of a curved shape.

In an embodiment, the flexible display 120 and a slidable housing 110 surrounding at least a portion of an edge of the flexible display 120 are disposed on the front surface of the electronic device 100.

In an embodiment, the slidable housing 110 may form a partial area of the front surface (e.g., a surface of the electronic device 100 facing the +z direction in FIG. 1A and FIG. 1B), the rear surface (e.g., a surface of the electronic device 100 facing the −z direction in FIG. 1A and FIG. 1B), and the lateral surface (e.g., a surface connecting the front surface and the rear surface of the electronic device 100) of the electronic device 100. According to an embodiment, the slidable housing 110 may form the rear surface and a partial area of the lateral surface of the electronic device 100.

In an embodiment, the slidable housing 110 may include a first housing 111 and a second housing 112 coupled to be movable within a predetermined (e.g., specified) range with respect to the first housing 111.

In an embodiment, the flexible display 120 may include a first part 121 couplable to the second housing 112 and a second part 122 extending from the first part 121 to be insertable into the electronic device 100.

In an embodiment, the electronic device 100 may include a first state 100a and a second state 100b. For example, the first state 110a and the second state 100b of the electronic device 100 may be determined according to a relative location of the second housing 112 with respect to the slidable housing 110 and the electronic device 100 may be configured to be transformable between the first state and the second state by a user operation or a mechanical operation.

In various embodiments, the first state 100a of the electronic device 100 may be a state before the slidable housing 110 is extended. The second state 100b of the electronic device may be a state in which the slidable housing 110 is extended.

In an embodiment, in case that the electronic device 100 is converted from the first state 100a to the second state 100b according to movement of the second housing 112, the second part 122 of the flexible display 120 may be withdrawn (or exposed/visible. As used herein, the terms "exposed" and "visible" used in conjunction with a description of the extending portion of the display may be used interchangeably) from the inside to the outside of the electronic device 100. In various embodiments, the withdrawal (or exposure) of the flexible display 120 may refer, for example, to the flexible display being viewed from the outside of the electronic device 100. In an embodiment, in case that the electronic device 100 is converted from the second state 100*b* to the first state 100*a* according to movement of the second housing 112, the second part 122 of the flexible display 120 may be inserted into the inside of the electronic device 100. In various embodiments, the insertion of the flexible display 120 may refer to the flexible display not being viewed or visible from the outside of the electronic device 100.

Figure 2:
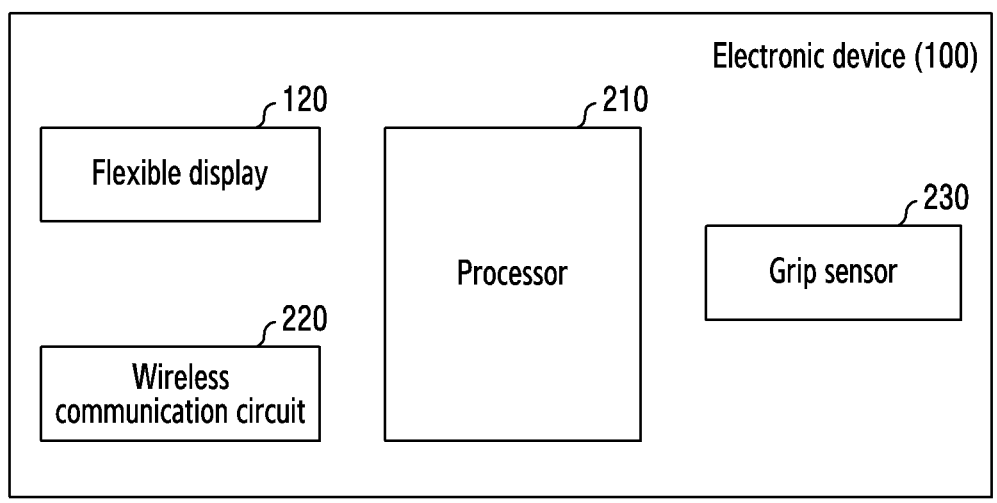
FIG. 2 is a block diagram illustrating an example configuration of an electronic device according to various embodiments.

FIG. 2 is a block diagram illustrating an example configuration of an electronic device 100 according to various embodiments.

Referring to FIG. 2, the electronic device 100 may include a flexible (rollable) display 120, a processor (e.g., including processing circuitry) 210, a wireless communication circuit 220, and/or a grip sensor 230. In an embodiment, the processor 210 may be electrically connected to the flexible display 120, the wireless communication circuit 220, or the grip sensor 230.

In various embodiments, the processor 210 may include various processing circuitry and execute, for example, software (e.g., a program) to control at least one other component (e.g., a hardware or software component) of the electronic device 100 connected to the processor 210 and perform various data processing and/or calculations.

In an embodiment, as at least a portion of data processing and/or calculation, the processor 210 may load a command and/or data received from other component (e.g., the flexible display 120, the wireless communication circuit 220, or the grip sensor 230) to a volatile memory (not shown), process the command or data stored in the volatile memory, and store result data in a non-volatile memory (not shown). The electronic device 100 may include a volatile memory and/or a non-volatile memory coupled to the processor 210.

In an embodiment, the processor 210 may recognize whether the slidable housing 110 is in the first state 100*a* or the second state 100*b* through a capacitance measurement value associated with the slidable housing (e.g., the slidable housing 110 in FIG. 1A and FIG. 1B). For example, in case the capacitance measurement value associated with the slidable housing 110 satisfies a designated range, the processor 210 may recognize the first state 100*a* in which the slidable housing 110 is not extended.

In an embodiment, the processor 210 may control transmission power to be transmitted through the wireless communication circuit 220 based on a result of comparison between a value measured by the grip sensor 230 and a parameter configured according to whether the slidable housing 110 is in the first state 110*a* or the second state 100*b*. For example, in the first state 100*a* in which the slidable housing 110 is not extended, the processor 210 may reduce transmission power to be transmitted through the wireless communication circuit 220 based on a result of comparison between a value measured by the grip sensor 230 and a first parameter corresponding to the first state 100*a* in case that the slidable housing 110 is gripped by a user.

In an embodiment, the grip sensor 230 may detect a state (e.g., whether a user is in contact) of the electronic device 100 and generate an electrical signal and/or data value (e.g., a capacitance value) corresponding to the detected state.

In an embodiment, the grip sensor 230 may determine whether the electronic device 100 (e.g., the slidable housing 110) comes in contact with a part of a user body by detecting changes in capacitance and/or permittivity.

In an embodiment, the grip sensor 230 may determine a contact state of the slidable housing 110 based on capacitance value changes. For example, in case that the capacitance value increases, the grip sensor 230 may determine that the slidable housing 110 is in a gripped state.

In an embodiment, a circuit for controlling an operation of the grip sensor 230 may be included in the electronic device 100 and implemented as the processor 210.

Figure 3A:
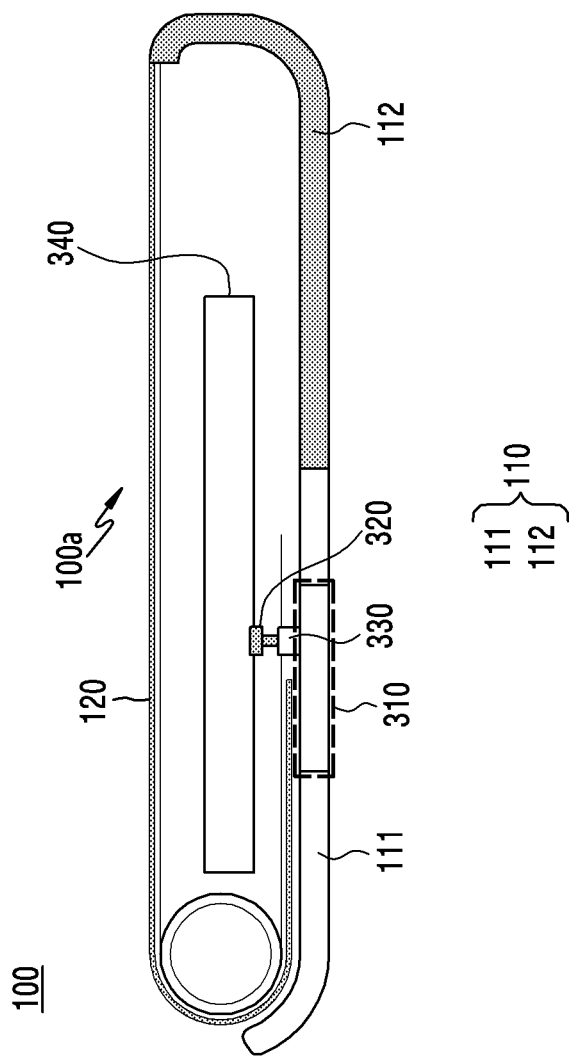
FIG. 3A is a cross-sectional view of an electronic device in a first state according to various embodiments.
Figure 3B:
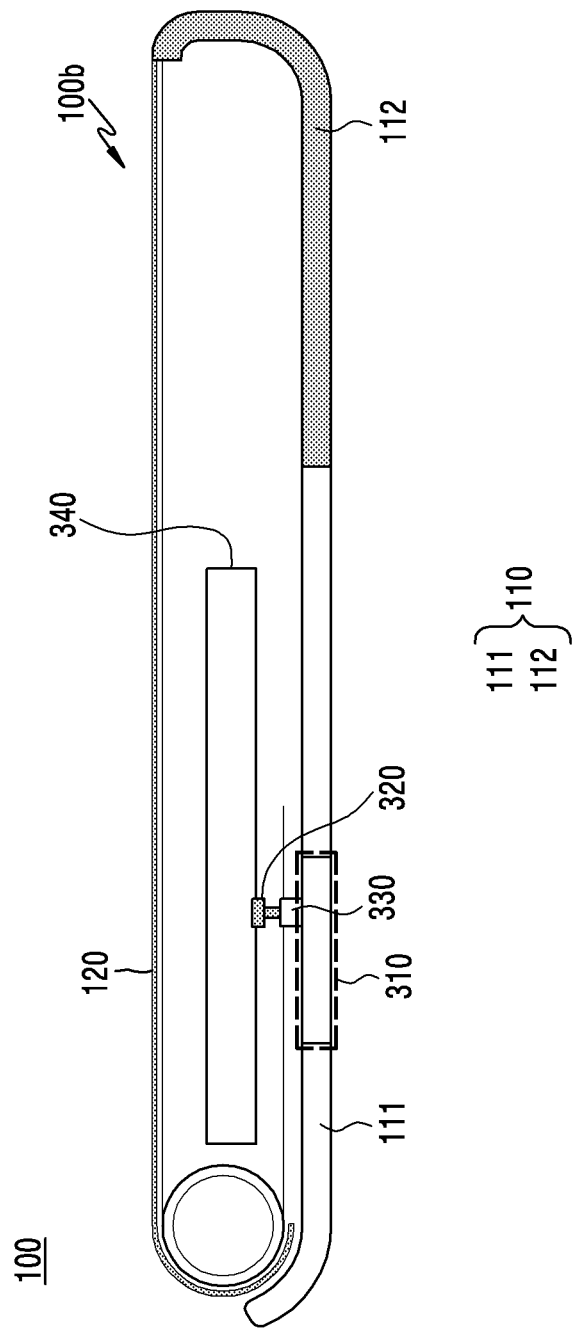
FIG. 3B is a cross-sectional view of an electronic device in a second state according to various embodiments.

FIG. 3A is a cross-sectional view of an electronic device 100 in a first state according to various embodiments. FIG. 3B is a cross-sectional view of an electronic device 100 in a second state according to various embodiments. FIG. 3A is a sectional view taken along line A-A' of the electronic device 100 in FIG. 1A according to various embodiments. FIG. 3B is a sectional view taken along line A-A' of the electronic device 100 in FIG. 1B according to various embodiments.

In an embodiment, the electronic device 100 may include the slidable housing 110 forming a partial exterior of the electronic device 100. In an embodiment, the second housing 112 may be coupled to be movable with respect to the first housing 111.

In an embodiment, the electronic device 100 may include the flexible display 120. In an embodiment, a portion of the flexible display 120 may be selectively exposed to the front surface of the electronic device 100 depending on whether the slidable housing 110 is extended.

In an embodiment, the electronic device 100 may include a driving part (not shown). In an embodiment, the driving part (not shown) may be configured to move the second housing 112 with respect to the first housing 111. For example, the driving part (not shown) may include a motor and various mechanical elements (e.g., a rolling gear) operated by the motor. The motor may be connected to the processor 210 of the electronic device 100 and operated to reduce or extend the slidable housing 110 in response to a signal of the processor 210.

Referring to FIG. 3A and FIG. 3B, a conductive part (e.g., including a conductive material or conductor) 310 may be formed on at least a portion of the first housing 111.

In an embodiment, the conductive part 310 formed on at least a portion of the first housing 111 may be in physical contact with a first contact part (e.g., contact) 320 located inside the slidable housing 110.

In an embodiment, the slidable housing 110 may include a printed circuit board 340 and the first contact part 320 may be disposed on the printed circuit board 340.

In an embodiment, the first contact part 320 may include a gasket, a C-clip, a pogo pin, a connector or any other suitable conductor.

In an embodiment, a first conductive fusion part 330 may be disposed on at least one area of the contact area 310.

In an embodiment, the first contact part 320 and the first conductive fusion part 330 may come in contact with each other to be electrically connected when the electronic device 100 is assembled.

In an embodiment, the grip sensor 230 may be disposed at at least a partial area on the printed circuit board 340.

In an embodiment, the first contact part 320 may be electrically connected to the grip sensor 230, the first conductive fusion part 330 and/or at least a portion of an antenna formed on the conductive part 310.

In an embodiment, the grip sensor 230 electrically connected to the first contact part 320 may acquire a capacitance measurement value changing according to extension of the flexible display 120 and transfer the acquired capacitance measurement value to a processor (e.g., the processor 210 in FIG. 2) via an antenna. For example, in case that the flexible display 120 is located adjacent to the first contact part 320 (e.g., in case that the electronic device 100 is in the first state 100a), the grip sensor 230 may transfer a capacitance measurement value to the processor 210.

In an embodiment, in case the capacitance measurement value transferred from the grip sensor 230 satisfies a first range, the processor 210 may determine that the slidable housing 110 is in the first state 100a. In an embodiment, in case the capacitance measurement value transferred from the grip sensor 230 satisfies a second range differing from the first range, the processor 210 may determine that the slidable housing 110 is in the second state 100b.

TABLE 1

| Capacitance measurement value (pF) | 73-74 | 70-71 |
|---|---|---|
| State of slidable housing | Unextended state | Extended state |
| Recognition distance | 10-15 mm | 0 mm |

Referring to Table 1, in an embodiment, in case that a capacitance measurement value acquired by the grip sensor 230 satisfies a range of about 73 pF to 74 pF, the processor 210 may determine a state in which the slidable housing 110 is not extended (e.g., the first state 100a). In an embodiment, in case that the capacitance measurement value acquired by the grip sensor 230 satisfies a range of about 70 pF to 71 pF, the processor 210 may determine a state in which the slidable housing 110 is extended (e.g., the second state 100a). In an embodiment, in case of determining the state in which the slidable housing 110 is not extended, a recognition distance may be determined to be about 10 to 15 mm. In an embodiment, in case of determining the state in which the slidable housing 110 is extended, a recognition distance may be determined to be about 0 mm. In various embodiments, the recognition distance may refer, for example, to a distance between the electronic device 100 and the human body recognized by the electronic device 100 using the grip sensor 230.

In an embodiment, the electronic device 100 may determine whether the slidable housing 110 is extended and/or a recognition distance based on the capacitance measurement value acquired by the grip sensor 230.

In an embodiment, the processor 210 may determine a grip state through a change of capacitance values of the conductive part 310 formed on at least a portion of the slidable housing 110 and the grip sensor 230 connected to the first contact part 320. For example, in case that there is contact with the slidable housing 110, the processor 210 may determine a grip state through a change of capacitance values transferred from the grip sensor 230.

In an embodiment, the capacitance measurement value that the processor 210 acquires from the grip sensor 230 connected to the first contact part 320 to determine whether the slidable housing 110 is in the first state 100a or the second state 100b may be quite larger than a capacitance value of the conductive part 310 acquired to determine a grip state.

In an embodiment, Table 2 shows example capacitance measurement values according to assembly states of various electronic components included in the electronic device 100.

TABLE 2

| Assembly state | Capacitance measurement value (pF) |
|---|---|
| Disconnected from the front after connection to non-defective sub | 48.8168 |
| Assembled to the front after connection to non-defective sub | 64.0028 |
| Assembled to the front and having bottom antenna connected thereto after connection to non-defective sub | 73.5559 |

Referring to Table 2, a capacitance measurement value may be changed according to an assembly state to the front and whether a bottom antenna is connected. In an embodiment, the front may include at least a partial area of the slidable housing 110 forming the front surface including the flexible display 120.

In an embodiment, the state of being disconnected from the front after connection to non-defective sub may refer, for example, to the front being separated in a state in which various electronic components configuring the electronic device 100 are assembled and/or connected.

In an embodiment, the state of being assembled to the front after connection to non-defective sub may refer, for example, to the front being assembled in a state in which various electronic components configuring the electronic device 100 are assembled and/or connected.

In an embodiment, the state of being assembled to the front and having a bottom antenna connected thereto after connection to non-defective sub may refer, for example, to a bottom antenna injection being assembled in a state in which various electronic components configuring the electronic device 100 are assembled and/or connected to be seated on the front.

In an embodiment, in case of the state of being disconnected from the front after connection to non-defective sub, a capacitance measurement value may be 48.8168 pF. In an embodiment, in case of the assembled to the front after connection to non-defective sub, a capacitance measurement value may be 64.0028 pF. In an embodiment, in case of the state of being assembled to the front and having a bottom antenna connected thereto after connection to non-defective sub, a capacitance measurement value may be 73.5559 pF.

Figure 4:
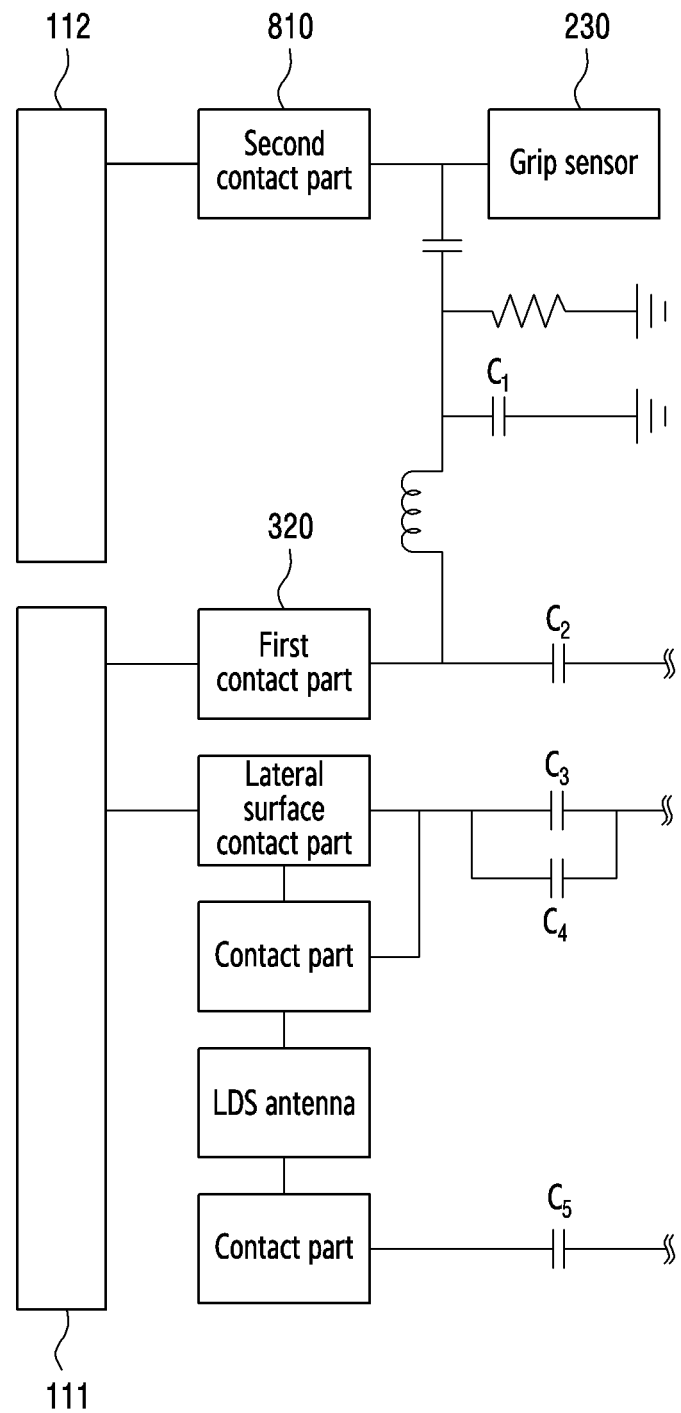
FIG. 4 is a circuit diagram for a grip sensor to operate in an electronic device according to various embodiments.

FIG. 4 is a circuit diagram for a grip sensor 230 to operate in an electronic device 100 according to various embodiments.

Referring to FIG. 4, in the electronic device 100 according to an embodiment, the conductive part 310 formed on at least a portion of the first housing 111 may be electrically connected to the grip sensor 230 via the first contact part 320, and a conductive part (not shown) formed on at least a portion of the second housing 112 may be electrically connected to the grip sensor 230 via a second contact part 810. The electrical connection relationship between the second contact part 810 and the grip sensor 230 will be described in greater detail below with reference to FIG. 8A and FIG. 8B.

In an embodiment, the electronic device 100 (e.g., the processor 210 in FIG. 2) may determine the grip state based on a capacitance value changed by the conductive part 310 and measured by the grip sensor 230 electrically connected to the conductive part 310 in case that the capacitance value of the conductive part 310 formed on at least a portion of the first housing 111 is changed.

In an embodiment, the electronic device 100 (e.g., the processor 210 in FIG. 2) may determine whether the slidable housing 110 is in the first state 100*a* or the second state 100*b* based on a capacitance measurement value acquired by synthesizing a capacitance value according to the extension of the flexible display 120 detected by the grip sensor 230 and other capacitance values.

Figure 5:
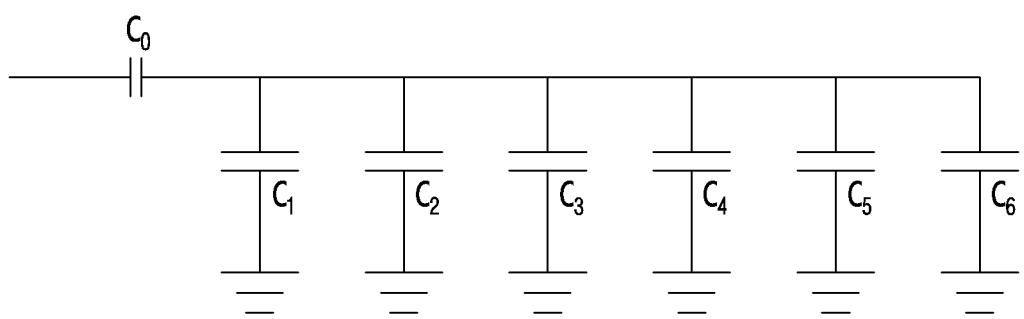
FIG. 5 is a circuit diagram illustrating example capacitances included in the circuit diagram of FIG. 4 according to various embodiments.

FIG. 5 is a circuit diagram illustrating example capacitances included in the circuit diagram of FIG. 4 according to various embodiments.

Referring to FIG. 5, the electronic device 100 (e.g., the processor 210 in FIG. 2) may determine whether the slidable housing 110 is in the first state 100*a* or the second state 100*b* based on a capacitance measurement value acquired by synthesizing a capacitance value ($C_6$) according to the extension of the flexible display 120 detected by the grip sensor 230 and other capacitance values ($C_1$, $C_2$, $C_3$, $C_4$, or $C_5$).

In an embodiment, the capacitance value ($C_6$) of the conductive part 310 formed on at least a portion of the slidable housing 110 may not affect the synthesized capacitance measurement value. In an embodiment, $C_0$ value may have a value of about 100 pF to remove a noise value applied to the synthesized capacitance value.

Figure 6:
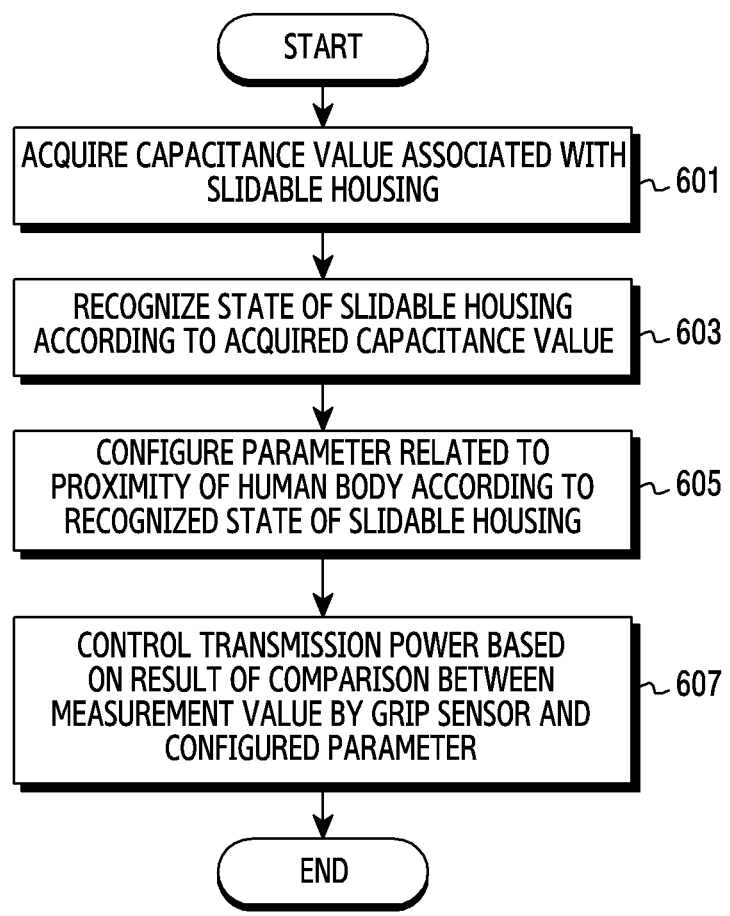
FIG. 6 is a flowchart illustrating an example operation of an electronic device according to various embodiments.

FIG. 6 is a flowchart illustrating an example operation of an electronic device 100 according to various embodiments.

Referring to FIG. 6, the electronic device 100 may recognize a state of the slidable housing 110 according to a capacitance value and control transmission power by configuring a parameter related to proximity of the human body based on the recognized state of the slidable housing 110. For example, the parameter related to proximity of the human body may include a parameter related to an electromagnetic wave absorption rate (specific absorption rate (SAR)).

According to an embodiment, in operation 601, the electronic device 100 may acquire a capacitance value related to the slidable housing 110. For example, the capacitance value related to the slidable housing 110 may include a capacitance value changed according to a state of the slidable housing 110 measured by the grip sensor 230.

According to an embodiment, in operation 603, the electronic device 100 may recognize a state of the slidable housing 110 according to the acquired capacitance value. For example, according to the acquired capacitance value, the electronic device 100 may recognize the first state 100*a* in which the slidable housing 110 is not extended and the second state 100*b* in which the slidable housing 110 is extended.

According to an embodiment, in operation 605, the electronic device 100 may configure a parameter related to proximity of the human body according to the recognized state (e.g., the first state 100*a* or the second state 100*b*) of the slidable housing 110. For example, in case that the recognized state of the slidable housing 110 corresponds to the first state 100*a*, the electronic device 100 may configure a parameter related to proximity of the human body as a parameter corresponding to the first state 100*a*.

According to an embodiment, in operation 607, the electronic device 100 may control transmission power based on a result of comparison between the measurement value by the grip sensor 230 and the configured parameter. For example, in case that the slidable housing 110 is in the second state 100*b*, the electronic device 100 may compare a parameter corresponding to the second state 100*b* with the capacitance value measured by the grip sensor 230 and control transmission power based on a result of the comparison.

Figure 7A:
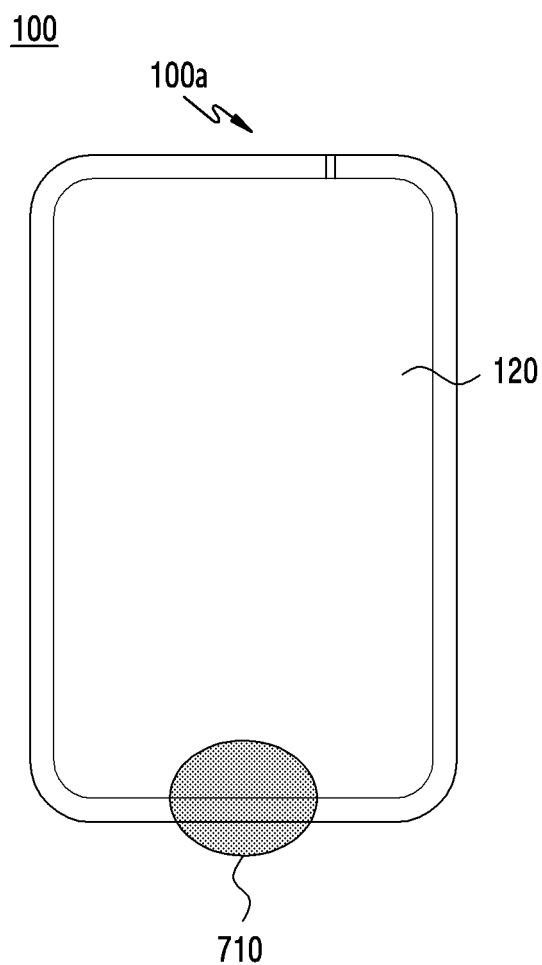
FIG. 7A is a diagram illustrating a surface of an electronic device in a first state according to various embodiments.
Figure 7B:
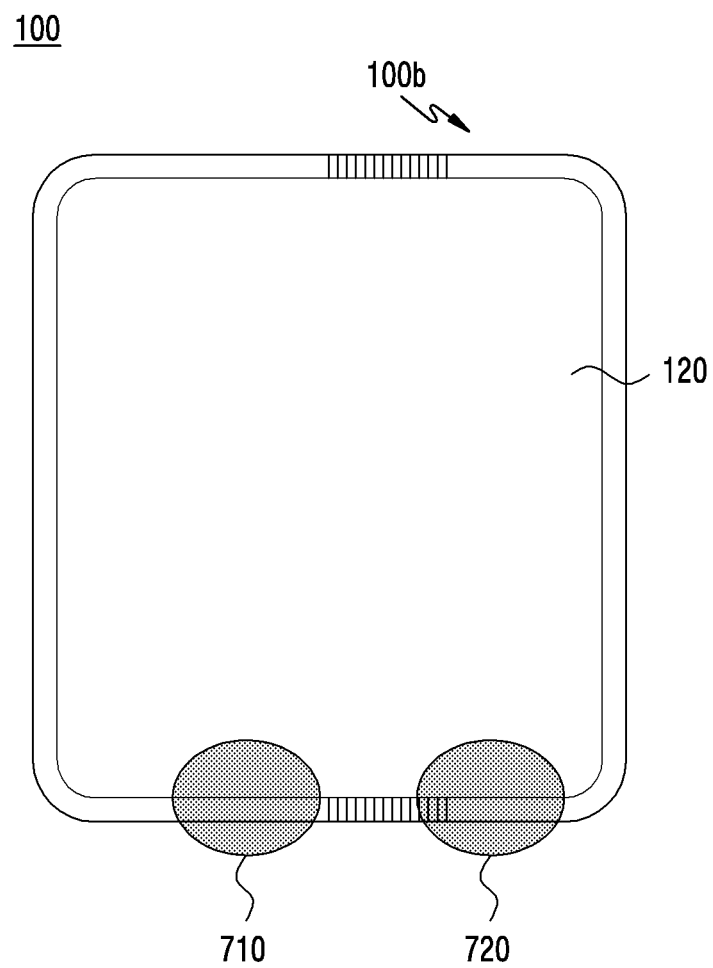
FIG. 7B is a diagram illustrating a surface of an electronic device in a second state according to various embodiments.

FIG. 7A is a diagram illustrating a surface of an electronic device 100 in a first state 100*a* according to various embodiments. FIG. 7B is a diagram illustrating a surface of an electronic device 100 in a second state 100*b* according to various embodiments.

Referring to FIG. 7A and FIG. 7B, the electronic device 100 may determine whether the slidable housing 110 is in the first state 100*a* or the second state 100*b* through a first part 710 and/or a second part 720 forming at least a portion of the slidable housing 110.

In an embodiment, the first part 100*a* and the second part 100*b* may include the grip sensor 230.

Figure 8A:
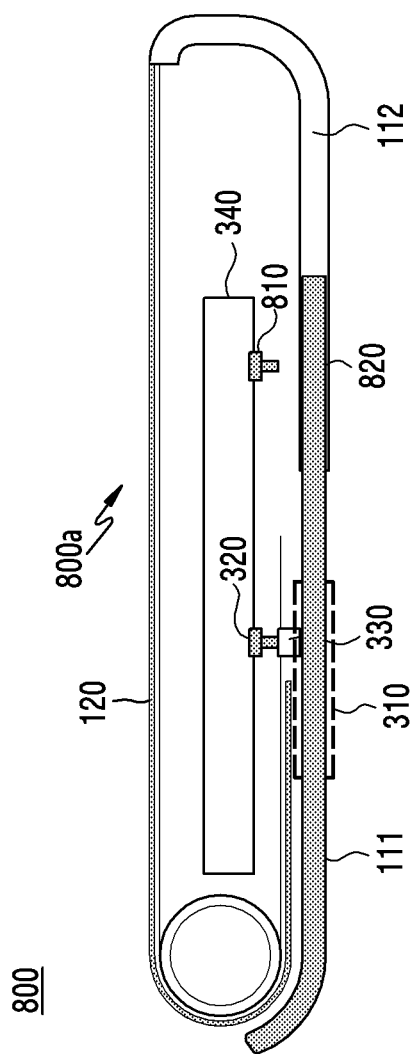
FIG. 8A is a cross-sectional view of an electronic device in a first state according to various embodiments.
Figure 8B:
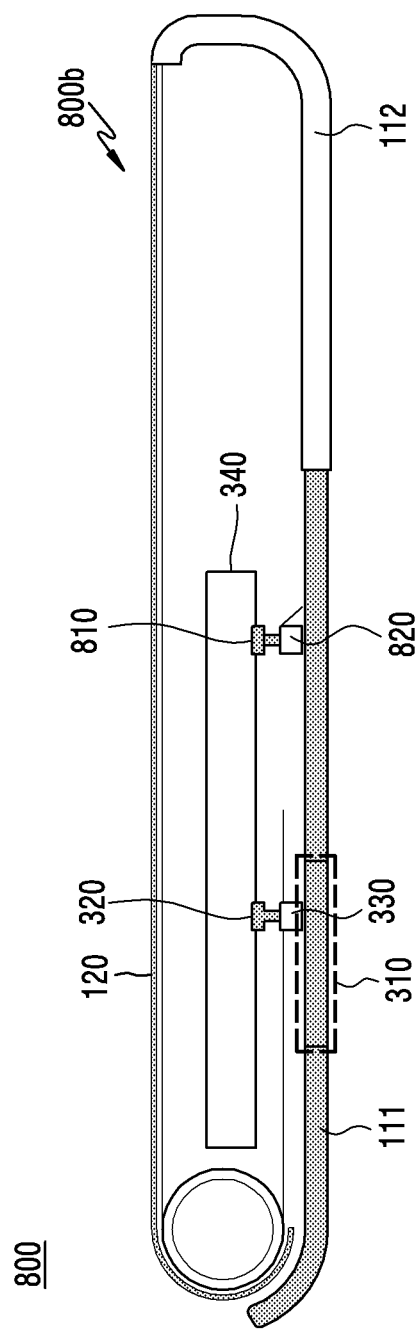
FIG. 8B is a cross-sectional view of an electronic device in a second state according to various embodiments.

FIG. 8A is a cross-sectional view illustrating a lateral surface of an electronic device 800 in a first state 800*a* according to various embodiments. FIG. 8B is a cross-sectional view illustrating a lateral surface of an electronic device 800 in a second state 800*b* according to various embodiments. FIG. 8A is a view in which a second conductive fusion part 820 and a second contact part 810 are added to a section taken along line A-A' of the electronic device 100 of FIG. 1A according to various embodiments. FIG. 8B is a view in which a second conductive fusion part 820 and a second contact part 810 are added to a section taken along line A-A' of the electronic device 100 of FIG. 1B according to various embodiments. Hereinafter, in relation to a description with respect to components corresponding to components of the electronic device 100 in FIG. 3A and FIG. 3B among components of the electronic device 800 in FIG. 8A and FIG. 8B, the explanation with respect to the components of the electronic device 100 in FIG. 3A and FIG. 3B will be applied as it is or an overlapping description may not be repeated here.

Referring to FIG. 8A and FIG. 8B, the electronic device 800 may include a slidable housing 110 including a first housing 111 and a second housing 112, a flexible display 120, a conductive part 310 configured to form at least a portion of the first housing, a first contact part 320, a first conductive fusion part 330, a printed circuit board 340, a second contact part 810, and/or a second conductive fusion part 820.

In an embodiment, the first contact part 320 and the second contact part 810 may be arranged on the printed circuit board 340 to be electrically connected to the printed circuit board 340.

In an embodiment, the second conductive fusion part 820 may be inserted by the second housing 112. For example, in case that the slidable housing 110 is in the first state 800*a*, the second conductive fusion part 820 may be formed on at least a portion of the first housing 111 while being inserted by the second housing 112.

In an embodiment, the first conductive fusion part 330 and the second conductive fusion part 820 may include a material similar or identical to a material forming the conductive part 310.

In an embodiment, the first housing 111 may include a recess configuring the first housing 111 and capable of receiving the second conductive fusion part 820 on at least a portion of the inside of the first housing 111. The state in which the second conductive fusion part 820 is inserted by the second housing 112 may refer, for example, to a state in which the second conductive fusion part 820 is pressed by the second housing 112 to be received in the recess in a state in which the slidable housing 110 is in the first state 800*a*.

In an embodiment, the second conductive fusion part 820 formed on at least a portion of the first housing 111 may be withdrawn by the second housing 112. For example, in case that the slidable housing 110 is in the second state 800*b*, the second conductive fusion part 820 may be formed on at least a portion of the first housing 111 while being withdrawn by the second housing 112. The state in which the second conductive fusion part 820 is withdrawn by the second housing 112 may refer, for example, to a state in which the second conductive fusion part 820 is moved to a direction in which the second contact part 810 of the electronic device 800 is disposed to come in contact with the second contact part 810 and coupled and fixed thereto in a state in which the slidable housing 110 is in the second state 800b. In an embodiment, the grip sensor 230 may be included in the printed circuit board 340 located inside the electronic device 800.

In an embodiment, the grip sensor 230 may be electrically connected to at least a portion of the first conductive fusion part 330 and the second conductive fusion part 820. For example, the first conductive fusion part 330 and the second conductive fusion part 820 may be electrically connected to the grip sensor 230 and at least a portion of an antenna formed on the conductive part 310.

In an embodiment, the grip sensor 230 electrically connected to the first conductive fusion part 330 and the second conductive fusion part 820 may acquire a capacitance measurement value changing according to extension of the flexible display 120 and transfer the acquired capacitance measurement value to a processor via the antenna.

In an embodiment, the grip sensor 230 connected to the first contact part 320 may acquire a first capacitance measurement value changing according to the extension of the flexible display 120. In an embodiment, the grip sensor 230 connected to the second contact part 810 may acquire a second capacitance measurement value changing according to the extension of the flexible display 120. For example, in case that the flexible display 120 is located adjacent to the first contact part 320 or the second contact part 810 comes in contact with at least a portion located inside the slidable housing 110 so that a capacitance value of the first contact part 320 or the second contact part 810 is changed, the grip sensor 230 may transfer a capacitance measurement value to the processor.

In an embodiment, in case that the first capacitance measurement value transferred from the grip sensor 230 satisfies a first range and the second capacitance measurement value satisfies a second range, the processor 210 may determine that the slidable housing 110 is in the first state 800a. In an embodiment, in case that the first capacitance measurement value transferred from the grip sensor 230 satisfies a third range different from the first range and the second capacitance measurement value satisfies a fourth range different from the second range, the processor 210 may determine that the slidable housing 110 is in the second state 800b.

TABLE 3

| First capacitance measurement value (pF) | 73-74 | 70-71 |
| Second capacitance measurement value (pF) | 48-50 | 64-66 |
| State of slidable housing | Unextended state | Extended state |
| Recognition distance | 10-15 mm | 0 mm |

Referring to Table 3, in an embodiment, in case that a first capacitance measurement value acquired by the grip sensor 230 satisfies the first range of about 73 pF to about 74 pF and the second capacitance measurement value satisfies the second range of about 48 pF to about 50 pF, the processor 210 may determine a state in which the slidable housing 110 is not extended (e.g., the first state 800a in FIG. 8A). In an embodiment, in case that the first capacitance measurement value acquired by the grip sensor 230 satisfies the third range of about 70 pF to about 71 pF and the second capacitance measurement value satisfies a range of about 64 pF to about 66 pF, the processor 210 may determine a state in which the slidable housing 110 is extended (e.g., the second state 800b in FIG. 8B). In an embodiment, in case of determining the state in which the slidable housing 110 is not extended, a recognition distance may be determined to be about 10 mm to about 15 mm. In an embodiment, in case of determining the state in which the slidable housing 110 is extended, a recognition distance may be determined to be about 0 mm. In an embodiment, the grip sensor 230 connected to the first contact part 320 may determine a grip state through a change of capacitance values of the conductive part 310 formed on at least a portion of the slidable housing 110. For example, in case that there is contact with the slidable housing 110, the grip sensor 230 may determine a grip state through a change of capacitance values.

In an embodiment, the capacitance measurement value that the grip sensor 230 connected to the first contact part 320 acquires to determine whether the slidable housing 110 is in the first state 800a or the second state 800b may be quite larger than a capacitance value of the conductive part 310 acquired to determine a grip state.

Figure 9:
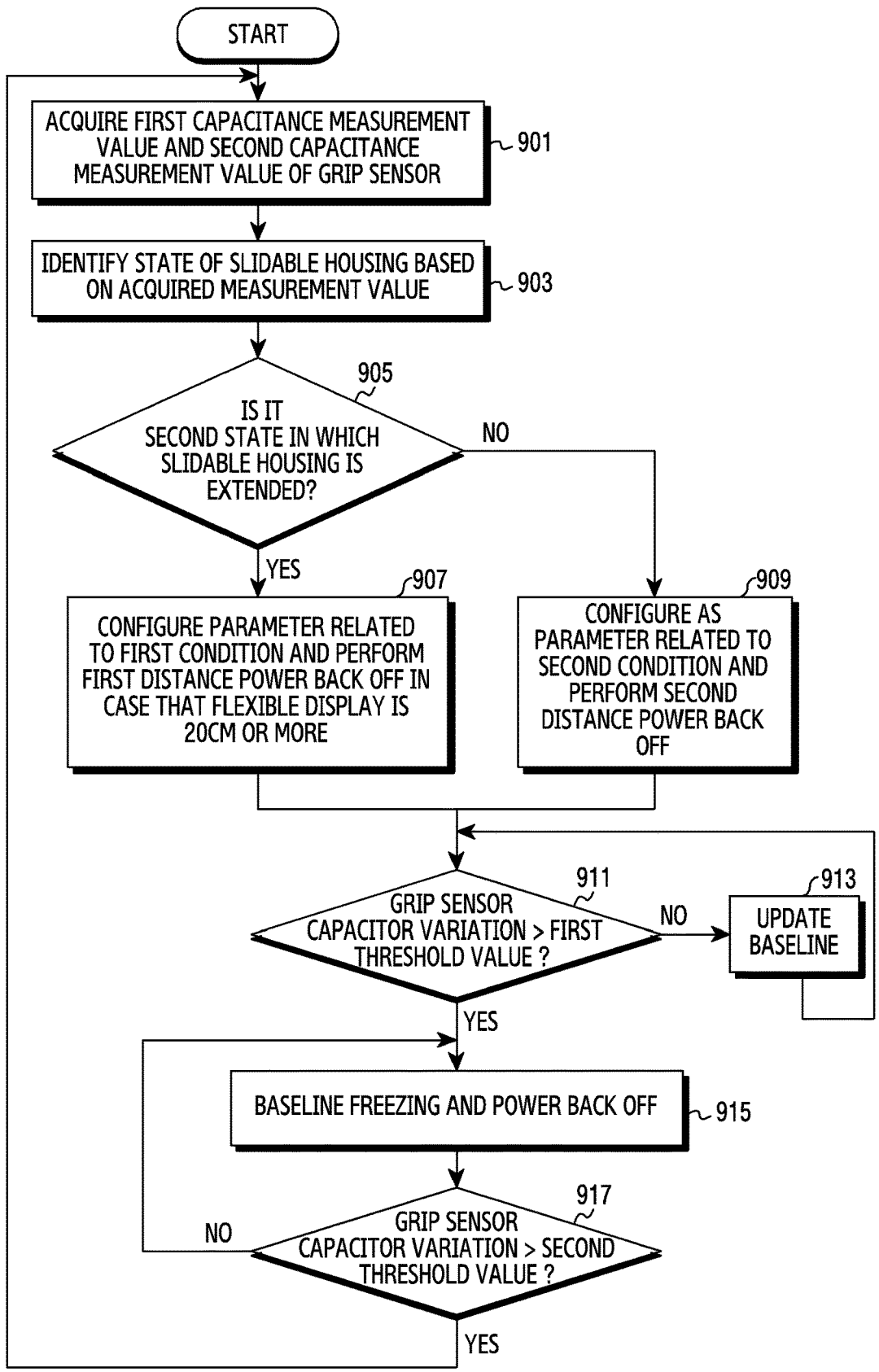
FIG. 9 is an flowchart illustrating an example baseline freezing and power back off operation in an electronic device according to various embodiments.

FIG. 9 is a flowchart illustrating an example baseline freezing and power back off operation in an electronic device 100 according to various embodiments.

Referring to FIG. 9, the electronic device 100 may perform a baseline freezing and power back off operation according to whether the slidable housing 110 is in the first state 100a or the second state 100b.

According to an embodiment, in operation 901, the electronic device 100 may acquire a first capacitance measurement value and a second capacitance measurement value of the grip sensor 230. For example, the electronic device 100 may acquire a first capacitance measurement value acquired through the first contact part 320 and a second capacitance measurement value acquired through the second contact part 810.

According to an embodiment, in operation 903, the electronic device 100 may identify a state of the slidable housing 110 according to the acquired first capacitance measurement value and second capacitance measurement value.

According to an embodiment, in operation 905, the electronic device 100 may determine whether it is the second state 100b in which the slidable housing 110 is extended.

According to an embodiment, in case that the slidable housing 110 is in the second state 100b, in operation 907, the electronic device 100 may configure a parameter related to proximity of the human body as a parameter related to a first condition and perform a first distance power back off operation in case that the flexible display 120 is 20 cm or more. For example, the first condition may refer to a condition in which the electronic device 100 is positioned on the user's lap and used and the first distance power back off operation may refer to an operation in which the electronic device 100 (or the processor 210) determines a recognition distance as about 0 mm and controls transmission power through the wireless communication circuit 220. According to an embodiment, in case that the slidable housing 110 is not in the second state 100b, in operation 909, the electronic device 100 may configure a parameter related to proximity of the human body as a parameter related to a second condition and perform a second distance power back off operation.

For example, the second condition may refer to a condition in which the electronic device 100 is gripped and used by a user and the second distance power back off operation may refer to an operation in which the electronic device 100 (or the processor 210) determines a recognition distance as about 10 mm or 15 mm and controls transmission power through the wireless communication circuit 220.

According to an embodiment, in operation 911, the electronic device 100 may determine whether a capacitance variation of the grip sensor 230 is greater than a first threshold value.

According to an embodiment, the electronic device 100 may determine whether the electronic device 100 is gripped (or a grip state) based on a result of comparison between the capacitance variation of the grip sensor 230 and the first threshold value.

According to an embodiment, in case that the capacitance variation of the grip sensor 230 is greater than the first threshold value, in operation 915, the electronic device 100 may perform the baseline freezing and power back off operation.

According to an embodiment, a baseline may refer, for example, to a counting value (e.g., an analog-digital-converter (ADC) value) with respect to a capacitance value collected by the electronic device 100 from the grip sensor 230. According to an embodiment, the baseline freezing operation may refer, for example, to the electronic device 100 not acquiring a counting value with respect to a capacitance value measured by the grip sensor 230. According to an embodiment, in case that the capacitance variation of the grip sensor 230 is equal to or less than the threshold value, in operation 913, the electronic device 100 may perform baseline updating and perform operation 911 again.

According to an embodiment, the baseline update operation may refer, for example, to the electronic device 100 acquiring a counting value with respect to a capacitance value measured by the grip sensor 230.

According to an embodiment, in operation 917, the electronic device 100 may determine whether a capacitance variation of the grip sensor 230 is greater than a second threshold value.

According to an embodiment, the electronic device 100 may determine whether the electronic device 100 is released from a grip (or a grip state) based on a result of comparison between the capacitance variation of the grip sensor 230 and the second threshold value. For example, the second threshold value may be less than the first threshold value.

According to an embodiment, in case that the capacitance variation of the grip sensor 230 is greater than the second threshold value, the electronic device 100 may perform operation 901 again. According to an embodiment, in case that the capacitance variation of the grip sensor 230 is equal to or smaller than the second threshold value, in operation 915, the electronic device 100 may perform the baseline freezing and power back off operation.

Figure 10:
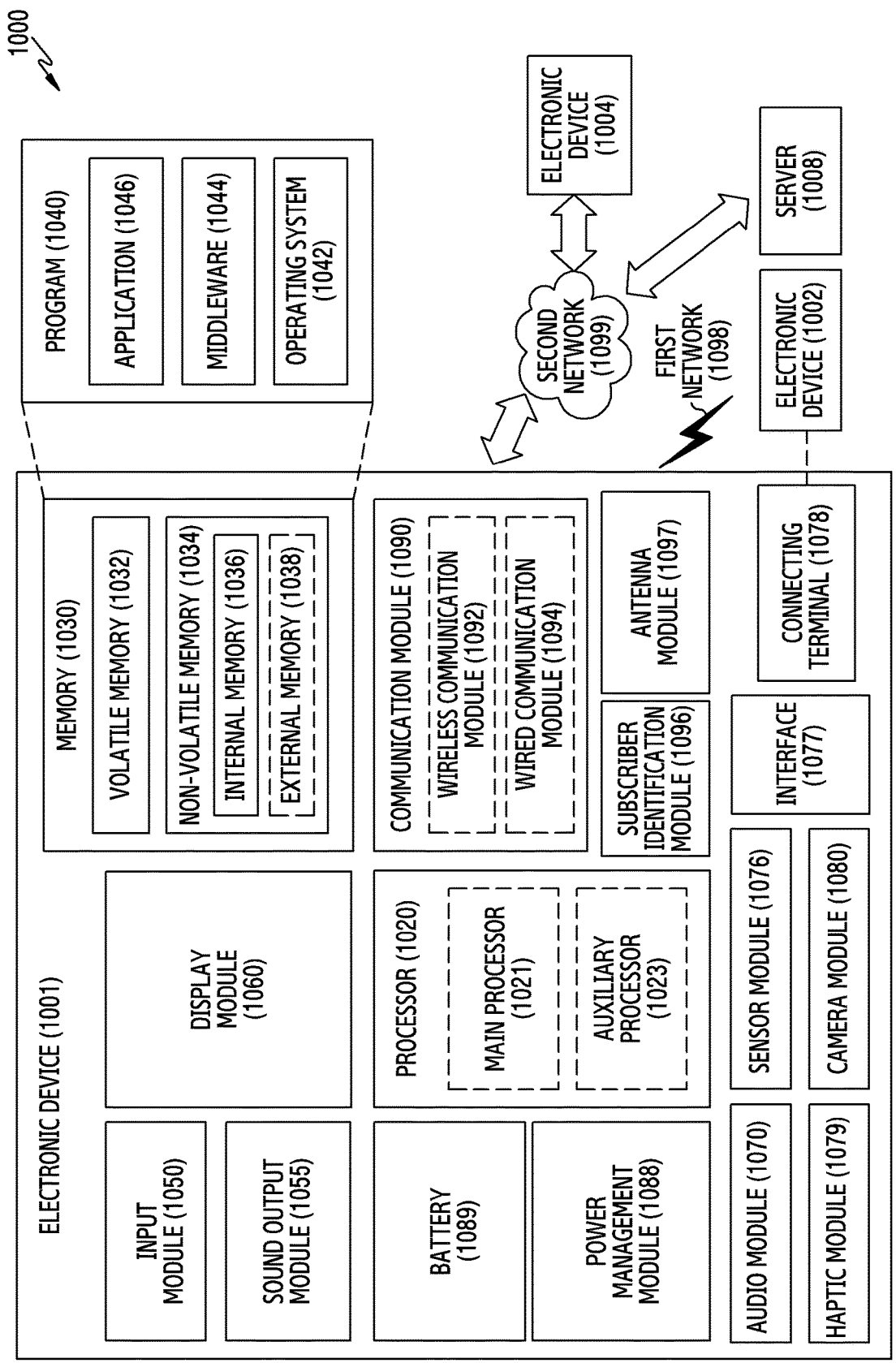
FIG. 10 is a block diagram illustrating an example electronic device in a network environment according to various embodiments.

FIG. 10 is a block diagram illustrating an example electronic device 1001 in a network environment 1000 according to various embodiments.

Referring to FIG. 10 the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™ wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

An electronic device according to various example embodiments includes: a slidable housing including a first housing and a second housing coupled to the first housing and configured to be movable within a designated range with respect to the first housing; a flexible display visible to outside of the electronic device through at least a portion of the slidable housing; a wireless communication circuit; a grip sensor; and at least one processor electrically connected to the flexible display, the wireless communication circuit, and the grip sensor, wherein the at least one processor is configured to: recognize, based on a capacitance measurement value associated with the slidable housing satisfying a first range, that the slidable housing is in a first state and configures a parameter related to a proximity of a human body as a first parameter corresponding to the first state; and recognize, based on the capacitance measurement value associated with the slidable housing satisfying a second range different from the first range, that the slidable housing is in a second state different from the first state and configures the parameter as a second parameter corresponding to the second state, and control the wireless communication circuit to control transmission power based on a result of comparison between a value measured by the grip sensor and the first parameter or the second parameter.

In an example embodiment, the designated range within which the second housing is movable with respect to the first housing is less than a length of the first housing in a direction in which the second housing moves.

In an example embodiment, the grip sensor is configured to detect a capacitance variation of the wireless communication circuit electrically connected to the grip sensor and determine a contact state based on the detected capacitance variation.

In an example embodiment, the first range to which the capacitance measurement value associated with the slidable housing is greater than a range within which a capacitance value, detected by the grip sensor, of the wireless communication circuit electrically connected to the grip sensor changes.

In an example embodiment, the first state of the slidable housing is a state in which the slidable housing is not extended, and the second state of the slidable housing is a state in which the slidable housing is extended.

In an example embodiment, based on the slidable housing being in the first state, the flexible display is located on the same surface of the slidable housing.

In an example embodiment, based on the slidable housing being in the second state, at least a portion of the flexible display and at least another portion of the flexible display are located on different surfaces of the slidable housing, respectively.

In an example embodiment, based on the slidable housing being in the first state and a length in a moving direction of the flexible display being greater than or equal to a designated length, the parameter related to the proximity of the human body is configured as a parameter related to a condition of use on a lap.

In an example embodiment, based on the slidable housing being in the first state and a length in a moving direction of the flexible display being less than a designated length, the parameter related to the proximity of the human body is configured as a parameter related to a grip condition.

In an example embodiment, the wireless communication circuit is configured to control the transmission power using baseline freezing and power back off.

A method of operating an electronic device according to various example embodiments may include: based on a capacitance measurement value associated with a slidable housing included in the electronic device satisfying a first range, recognizing that the slidable housing is in a first state, and configuring a parameter related to the proximity of a human body as a first parameter corresponding to the first state; and based on the capacitance measurement value associated with the slidable housing satisfying a second range different from the first range, recognizing that the slidable housing is in a second state different from the first state, configuring the parameter as a second parameter corresponding to the second state, and controlling transmission power based on a result of comparison between a value measured by a grip sensor included in the electronic device and the first parameter or the second parameter.

A method of operating an electronic device according to an example embodiment may further comprise: detecting, by the grip sensor, a capacitance variation of a wireless communication circuit electrically connected to the grip sensor; and determining a contact state based on the detected capacitance variation.

In an example embodiment, the first range to which the capacitance measurement value associated with the slidable housing is greater than a range within which a capacitance value, detected by the grip sensor, of a wireless communication circuit electrically connected to the grip sensor changes.

In an example embodiment, the first state of the slidable housing is a state in which the slidable housing is not extended, and the second state of the slidable housing is a state in which the slidable housing is extended.

A method of operating an electronic device according to an example embodiment may further comprising: controlling, by a wireless communication circuit included in the electronic device, the transmission power using baseline freezing and power back off.

An electronic device according to various example embodiments includes: a slidable housing including a first housing and a second housing coupled to the first housing and configured to be movable within a designated range with respect to the first housing; a flexible display visible to the outside of the electronic device through at least a portion of the slidable housing; a wireless communication circuit; a grip sensor; and at least one processor electrically connected to the flexible display, the wireless communication circuit, and the grip sensor, wherein the at least one processor is configured to: recognize, based on a first capacitance measurement value associated with the slidable housing satisfying a first range and a second capacitance measurement value associated with the slidable housing satisfying a second range, that the slidable housing is in a first state and configures a parameter related to the proximity of a human body as a first parameter corresponding to the first state; and recognize, based on the capacitance measurement value associated with the slidable housing satisfying a second range different from the first range, that the slidable housing is in a second state different from the first state and configures the parameter as a second parameter corresponding to the second state, and control the wireless communication circuit to control transmission power based on a result of comparison between a value measured by the grip sensor and the first parameter or the second parameter.

In an example embodiment, the designated range within which the second housing is movable with respect to the first housing is less than a length of the first housing in a direction in which the second housing moves.

In an example embodiment, the grip sensor is configured to detect a capacitance variation of the wireless communication circuit electrically connected to the grip sensor and determine a contact state based on the detected capacitance variation.

In an example embodiment, the first range associated with the capacitance measurement value associated with the slidable housing and a second capacitance measurement value associated with the slidable housing is greater than a range within which a capacitance value, detected by the grip sensor, of a wireless communication circuit electrically connected to the grip sensor changes.

In an example embodiment, the first state of the slidable housing is a state in which the slidable housing is not extended, and the second state of the slidable housing is a state in which the slidable housing is extended.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a slidable housing comprising a first housing and a second housing coupled to the first housing and configured to be movable within a designated range with respect to the first housing;
   a flexible display visible to the outside of the electronic device through at least a portion of the slidable housing;
   a wireless communication circuit;
   a grip sensor;
   at least one processor including processing circuitry electrically connected to the flexible display, the wireless communication circuit, and the grip sensor; and
   a memory storing instructions which, when executed individually and/or collectively by the at least one processor, controls the electronic device to:
   based on a capacitance measurement value associated with the slidable housing satisfying a first range, recognize that the slidable housing is in a first state in which the slidable housing is not extended, and configure a parameter related to proximity of a human body as a first parameter corresponding to the first state; and
   based on the capacitance measurement value associated with the slidable housing satisfying a second range different from the first range, recognize that the slidable housing is in a second state different from the first state, and configure the parameter as a second parameter corresponding to the second state in which the slidable housing is extended, wherein the second parameter indicates that a recognition distance between the electronic device and a human body is less than a predetermined distance, and
   wherein the wireless communication circuit is configured to control transmission power based on a result of comparison between a change of capacitance measured by the grip sensor and the first parameter or the second parameter.

2. The electronic device of claim 1, wherein the designated range within which the second housing is movable with respect to the first housing is less than a length of the first housing in a direction in which the second housing moves.

3. The electronic device of claim 1, wherein the grip sensor is configured to: detect the change of capacitance of the wireless communication circuit electrically connected to the grip sensor and the memory stores instructions which, when executed individually and/or collectively by the at least one processor, controls the electronic device to determine a contact state through the detected capacitance variation.

4. The electronic device of claim 1, wherein the first range of the capacitance measurement value associated with the slidable housing is greater than a range within which a capacitance value, detected by the grip sensor, of the wireless communication circuit electrically connected to the grip sensor changes.

5. The electronic device of claim 1, wherein the first state of the slidable housing is a state in which the slidable housing is not extended, and
the second state of the slidable housing is a state in which the slidable housing is extended.

6. The electronic device of claim 5, wherein based on the slidable housing being in the first state, the flexible display is located on the same surface of the slidable housing.

7. The electronic device of claim 5, wherein based on the slidable housing being in the second state, at least a portion of the flexible display and at least another portion of the flexible display are located on different surfaces of the slidable housing, respectively.

8. The electronic device of claim 5, wherein based on the slidable housing being in the first state and a length in a moving direction of the flexible display is greater than or equal to a designated length, the parameter related to the proximity of the human body is configured as a parameter related to a condition of use on a lap.

9. The electronic device of claim 5, wherein based on the slidable housing being in the first state and a length in a moving direction of the flexible display being less than a designated length, the parameter related to the proximity of the human body is configured as a parameter related to a grip condition.

10. The electronic device of claim 1, wherein the wireless communication circuit is configured to control the transmission power using baseline freezing and power back off.

11. A method of operating an electronic device, the method comprising:
based on a capacitance measurement value associated with a slidable housing included in the electronic device satisfying a first range, recognizing that the slidable housing is in a first state in which the slidable housing is not extended, and configuring a parameter related to proximity of a human body as a first parameter corresponding to the first state; and
based on the capacitance measurement value associated with the slidable housing satisfying a second range different from the first range, recognizing that the slidable housing is in a second state different from the first state, configuring the parameter as a second parameter corresponding to the second state in which the slidable housing is extended, wherein the second parameter indicates that a recognition distance between the electronic device and a human body is less than a predetermined distance, and
controlling transmission power based on a result of comparison between a change of capacitance measured by a grip sensor included in the electronic device and the first parameter or the second parameter.

12. The method of claim 11, further comprising:
detecting, by the grip sensor, the change of capacitance of a wireless communication circuit electrically connected to the grip sensor; and
determining a contact state through the detected change of capacitance of the of wireless communication circuit.

13. The method of claim 11, wherein the first range of the capacitance measurement value associated with the slidable housing belongs is greater than a range within which a capacitance value, detected by the grip sensor, of a wireless communication circuit electrically connected to the grip sensor changes.

14. The method of claim 11, wherein the first state of the slidable housing is a state in which the slidable housing is not extended, and
the second state of the slidable housing is a state in which the slidable housing is extended.

15. The method of claim 11, further comprising: controlling, by a wireless communication circuit included in the electronic device, the transmission power using baseline freezing and power back off.

\* \* \* \* \*